United States Patent Office 3,264,863
Patented August 9, 1966

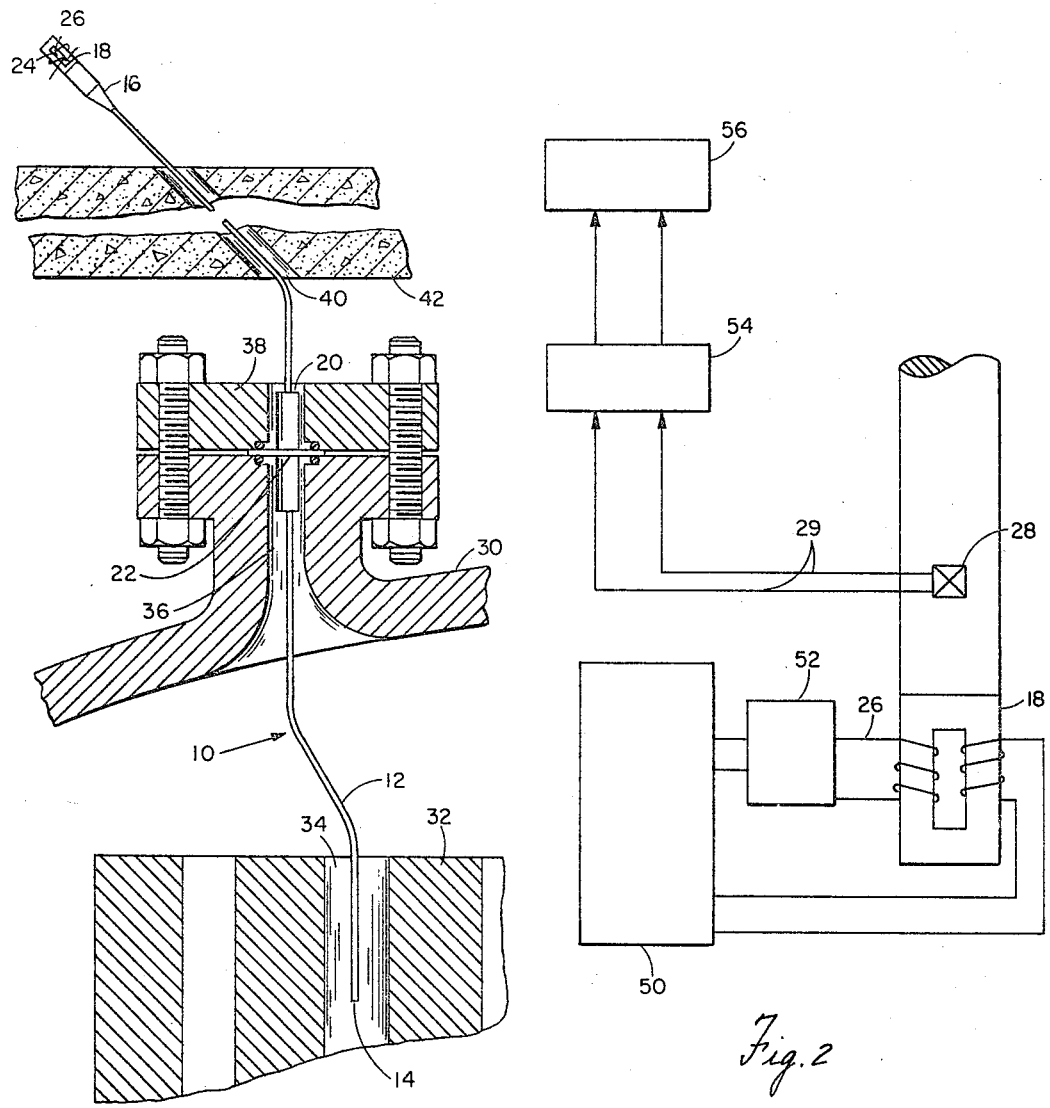

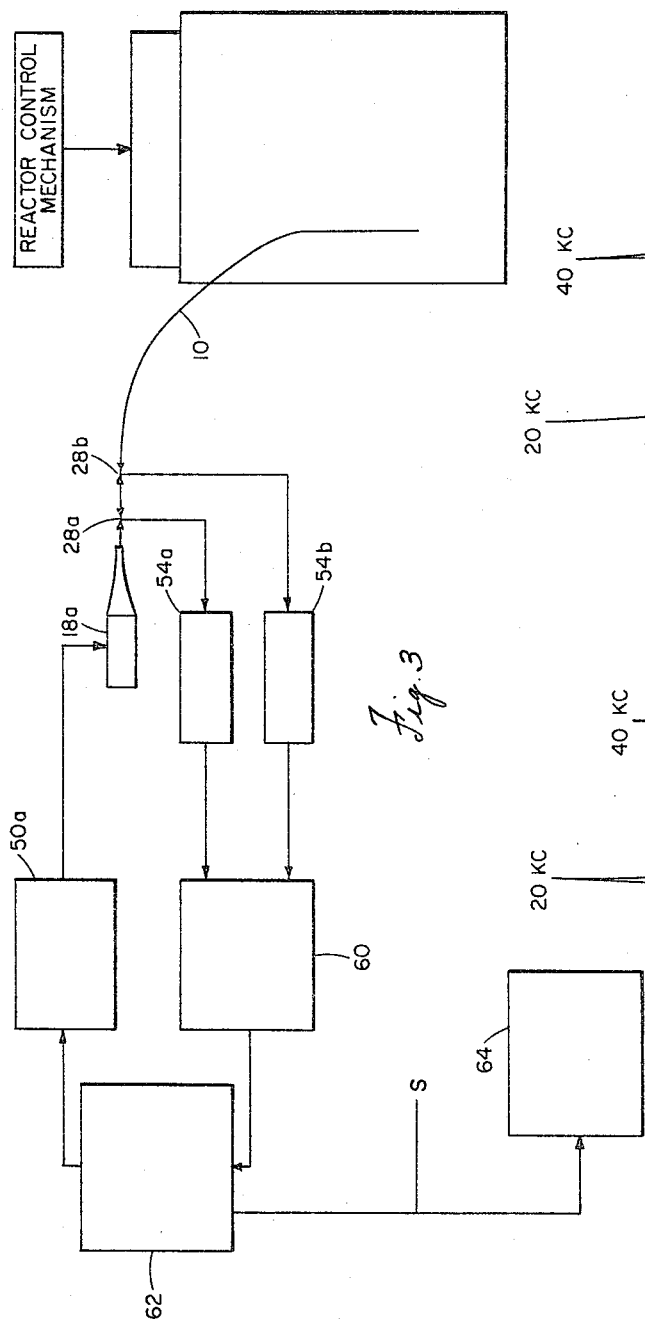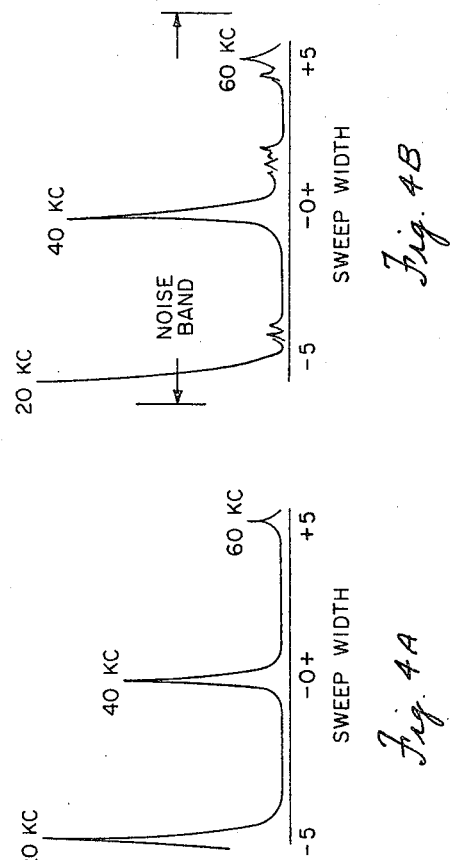
INVENTOR.
NICHOLAS MAROPIS

3,264,863
METHOD AND APPARATUS FOR DETECTING INCIPIENT BOILING OF A LIQUID
Nicholas Maropis, West Chester, Pa., assignor, by mesne assignments, to the United States of America as represented by the United States Atomic Energy Commission
Filed May 27, 1963, Ser. No. 283,646
5 Claims. (Cl. 73—67)

In general, this invention relates to a new and improved method of and apparatus for detecting imminent boiling and cavitation and, more particularly, to a method and apparatus utilizing ultrasonic techniques therefor.

Boiling occurs in a liquid under certain conditions of pressure and temperature. There are many applications where it is desirable to avoid boiling of a liquid, but where it is difficult to determine the exact pressure and temperature of the liquid at a given point in the system. One such application is in the generation of power utilizing pressurized water nuclear reactors. In this type of reactor, steam is generated in the secondary loop boiler which is heated by the pressurized-water-coolant-moderator circulating through the nuclear fuel elements in the primary loop. The cooling channels between fuel elements are narrow, and the primary loop water must be maintained at about 2500 p.s.i. to prevent boiling. At this pressure, the water may reach approximately 350° C. before boiling.

Since a steam film on the surface of a fuel element acts as an effective thermoinsulator, boiling in the primary loop is both undesirable and hazardous. The reduction in heat transfer can cause variation in steam generating capacity and allow local increases in temperature which can lead to catastrophic failure of the fuel elements. Not all regions of the reactor core are equally hot, and in an operating reactor, there may be local variations in pressure. It is therefore necessary to provide reliable means for detecting imminent or incipient boiling in these critical hot channels. With such detector, it would be possible to reliably operate the reactor at maximum power levels, as there would be adequate warning of any transition from non-boiling heat transfer in the primary loop.

The high pressure and high radiation levels existing within nuclear reactors pose conditions far beyond those for which conventional instrumentation may be designed. The detecting device must be capable of indicating the imminence or onset of boiling at critical points within the reactor core, even though local conditions of pressure and temperature might be unknown, and it should be capable of operating through heavy radiation shielding and reactor pressure vessel walls.

It is therefore the general object of this invention to provide a new and improved method of and apparatus for determining imminent boiling in a fluid.

Another object of this invention is to provide new and improved apparatus for determining incipient boiling utilizing ultrasonic techniques.

A further object of this invention is to provide new and better apparatus for determining imminent boiling in a pressurized vessel at any point within the vessel.

Other objects will appear hereinafter.

The objects of this invention are accomplished by the provision of an apparatus and method for producing vibratory motion resulting in pressure fluctuations within the liquid to be monitored. The vibratory motion of the probe in the liquid, and in particular its association with the production of cavitation, is utilized in connection with variation in acoustic power transmission along the probe to determine the imminence or incidence of boiling.

Cavitation apparently occurs when a liquid is subjected to sufficient tension forces, one means of producing cavitation being the application of ultrasonic vibration. It is believed that the dust or dissolved gas present in nearly all liquids provides nuclei about which cavitation bubbles may form under the influence of such tension, their behavior seemingly being determined by their radii and the frequency of the sound field. It has been found that the collapse of these bubbles produces a noise spectrum containing harmonics of the exciting frequency which is detectable by means of the present invention.

Thus, appropriate transmission of acoustic power along the probe into the liquid can produce cavitation in the liquid at the probe face which is immersed in the liquid. The amount of power required to produce cavitation is dependent on the local temperature and pressure, this power approaching zero as the liquid approaches the boiling point. The present invention can be utilized not only to produce cavitation, but also to detect cavitation, especially in areas where direct visual observation is impossible, thereby providing means for ascertaining imminent or incipient boiling, this boiling information being usable for purposes such as quality control and safety.

For the purpose of illustrating the invention, there is shown in the drawings forms which are presently preferred, it being understood, however, that this invention is not limited to the precise arrangements and instrumentalities shown.

FIGURE 1 is a cross-sectional view of an embodiment utilizing the principles of the present invention in connection with a pressurized water reactor.

FIGURE 2 is a block diagram of an embodiment of instrumentation utilized in accordance with the principles of the present invention.

FIGURE 3 is a second embodiment of instrumentation appropriate for use in connection with the present invention.

FIGURE 4 is a pair of graphical displays of cavitation noise bands.

Figure 5:
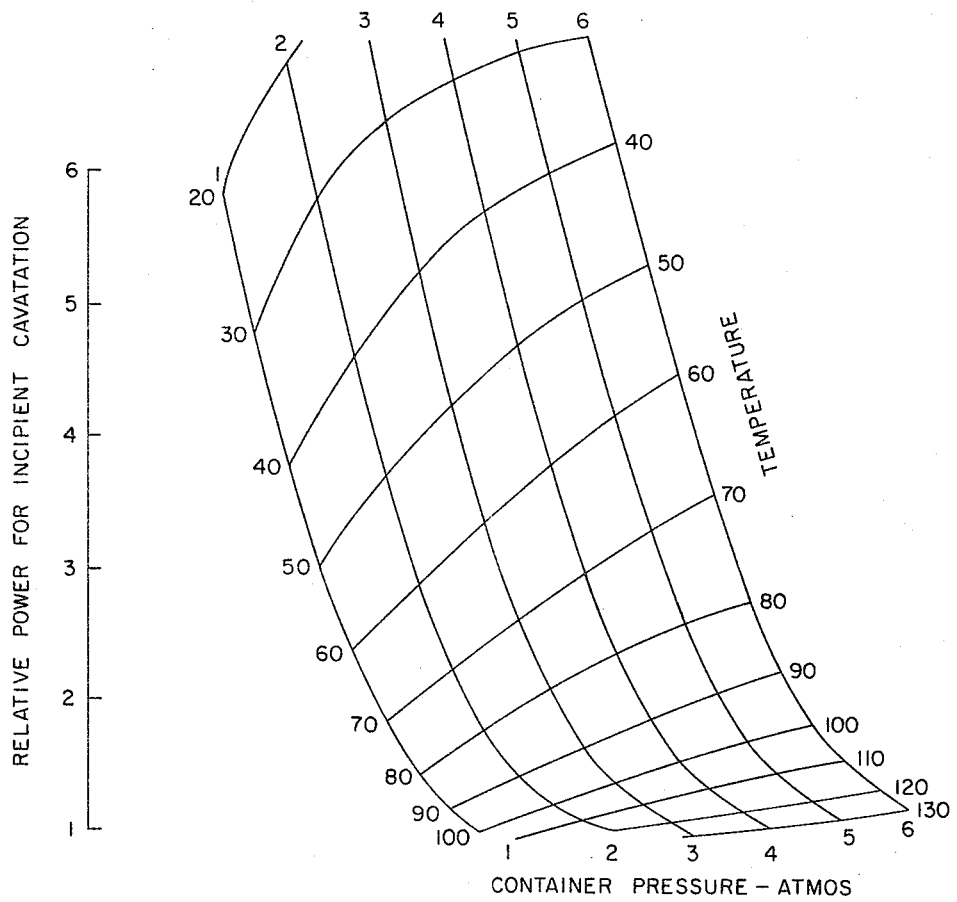
FIGURE 5 is a graph of exemplary data concerning relative power required to produce cavitation as detected in accordance with the present invention.

Referring to the drawing in detail wherein like numerals indicate like elements, there is shown in FIGURE 1 a schematic diagram of an acoustic probe built in accordance with the principles of the present invention placed in a wall of a nuclear reactor. The acoustic probe shown in FIGURE 1 is generally designated by the numeral 10.

The probe 10 includes acoustic coupler bar 12, having a probe face 14, and acoustic coupler 16, adapted to be energized from an ultrasonic transducer 18 so as to provide vibratory energy at the probe face 14 of the acoustic probe 10. The coupler bar 12 is provided with a force-insensitive mount 20.

The force-insensitive mount 20 includes a sleeve having a length of one-half wavelength in the material and geometry of the sleeve at the operating frequency (or a length of whole multiples of one-half wavelength). One end of the force-insensitive mount 20 is rigidly attached to the coupler 12 at an anti-node region on said coupler in a manner which provides a water-tight seal therebetween. The other end of the sleeve of the force insensitive mount 20 is unattached. The force-insensitive mount 20 is made from metal such as steel, stainless steel, Monel, or other suitable low hysteresis material. Since only one end of the so-dimensioned sleeve of the force-insensitive mount is attached, a true node will develop in the sleeve at flange 22 which is one-quarter wavelength distant from the unattached end of the sleeve of the force-insensitive mount 20 (or at odd whole number multiples of one-quarter wavelength if the mount 20 is, as aforesaid, longer than one-half wavelength). Thus, the mount 20 supports the coupler 12 but has a minimal effect on its acoustical properties.

The coupler bar 12 is metallurgically bonded or screw connected to coupler 16. The end of coupler 16 remote from coupler bar 12 is fixedly joined to the vibratory energy transducer or generator 18. The transducer 18 may be of the magnetostrictive type and of conventional construction, comprising a one-half-wavelength-long laminated core of nickel, nickel-iron alloy, Permendur (an iron-cobalt alloy), Alfenol (an aluminum-iron alloy) or other magnetostrictive material, properly dimensioned to insure axial resonance with the frequency of alternating current applied thereto by excitation coil 26 so as to cause it to decrease or increase in length according to its coefficient of magnetostriction. The detailed construction of a suitable magnetostrictive transducer, which in the illustrated embodiment comprises a nickel stack, is well known to those skilled in the art and does not form a part of the present invention and, accordingly, no description of its construction will be made herein. It will be appreciated by those skilled in the art that in place of the magnetostrictive transducer 18, other known types of transducers may be substituted; for example, electrostrictive or piezoelectric transducers may be utilized. Coil 26 is connected to a power supply (not shown) incorporating an oscillator and amplifier suitable for powering the transducer 18; such equipment is well known to the art. The transducer 18 is provided with a polarizing coil 24, the desirability of magnetically polarizing the magnetostrictive transducer 18 by means of coil 24 in order for the metal laminations to efficiently convert the applied RF energy from excitation coil 26 into elastic vibratory energy being readily understood by those skilled in the art.

The probe 10 is adapted to be placed within a pressure vessel 30 of a pressurized water reactor. Within vessel 30 is a reactor core 32 having coolant channels 34 running vertically therethrough. Coupler 12 of probe 10 is adapted to be placed within any particular coolant channel to determine imminent or incipient boiling within that particular coolant channel. The pressure vessel 30 has a flanged opening 36 in the top thereof through which passes the probe 10. The flange opening 36 has an annular cover plate 38 bolted thereto with its center hole in line with flanged opening 36 to clamp to flange 22 on mount 20, so as to form a water-impervious seal to prevent leakage from within the pressure vessel 30. The coupler 12 passes through an angled hole 40 in a radiation shield 42 so that the power and read-out equipment of the probe 10 are shielded from the radiation within the reactor.

The couplers 12 and 16 are essentially acoustic transmission lines having the customary acoustical wavelength dimensioning for operation at a resonant frequency, and are preferably made from a low attenuation metal such as Monel, aluminum bronze, etc. Coupler 16 is of conventional contoured (such as tapered) construction. Coupler 12 need not be particularly thin or narrow or wire-like; its maximum cross-sectional dimension is preferably less than one-quarter wavelength in the material of which it is made at the frequency of operation. Such acoustical transmission lines or wave guides can be considered flexible, although bendable or formable is a more precise description. They can be of substantial length with no immediately evident limits, although, due to hysteresis losses in materials, the length of such transmission lines should probably be less than around 15 to 25 feet for efficient operation. The formability of coupler 12 enables the same to be bent, thereby allowing it to pass through angled opening 40 and to be bent into position within a particular coolant channel 34 in reactor core 32. Coupler 12 can circumvent any obstructions between the wall of pressure vessel 30 and the particular coolant channel 34. For efficient power transmission, the bend radius and other limitations are set forth in detail in co-pending patent application Serial No. 120,233 filed on June 28, 1961 by Dennison Bancroft et al., entitled "Apparatus and Method for Introducing High Levels of Vibratory Energy to a Work Area," and issued January 26, 1965 as Patent 3,166,840. The disclosure in said patent is incorporated herein by reference.

For a good impedance match, one end of coupler bar 12 is metallurgically joined to the adjacent small end of coupler 16. At this joint, the cross-sectional areas of the transmission lines 12 and 16 should be identical if they are of the same material, as is well known to the art. Choice of material for coupler 12 may be restricted by enviromental requirements (such as nuclear requirements in a nuclear application) in addition to acoustical requirements, stainless steel being an acceptable material for a nuclear application.

In co-pending patent application Serial No. 66,642 filed November 1, 1960, for "Method and Apparatus for Measurement of Acoustic Power Transmission and Impedance," by Dennison Bancroft et al., and assigned to the assignee of this application, the disclosure of which is incorporated herein by reference, is shown a sensitive apparatus and method for directly determining acoustical energy transmitted in an acoustic transmission line, and incorporating sensing elements such as those herein described.

In this regard, a vibration sensing element 28 is here shown placed on coupler 12. This sensing element could be a small electromechanical transducer, such as a barium titanate wafer, attached at a nodal region of the vibration on coupler 12. This sensing element will produce an alternating electrical signal proportional to the alternating mechanical radial displacement (maximum at a node, minimum at an anti-node) of a particle at the point of attachment. Such elements are acceleration sensitive and the mechanical acceleration is 180 degrees out of phase with the displacement.

Inasmuch sensing elements are damaged if heated to above about 60° C., cooling provision (such as circulating cooling water through the section of the acoustic coupler to which element 28 is attached) is desirable, for efficient operation, in applications likely to result in overheating.

Cooling of the transducer (as by dry oil-free air) is advisable, for efficient operation, to dissipate heat generated by passage of electric current through the transducer windings.

In operation, as shown in FIGURE 2, sensing element 28, located at a node on coupler 12 for purposes of this embodiment, as aforesaid, has its leads 29 connected to a band pass amplifier 54 which feeds a frequency analyzer 56, such as Model SB–51a manufactured by Panoramic Radio Products, Mount Vernon, New York. An ultrasonic generator or power source 50 (incorporating a suitable oscillator and amplifier, as above indicated) is utilized to excite coil 26 of transducer 18. The electrical power input to the transducer 18 via coil 26 is monitored by means of an alternating current watt meter 52.

With the end face of probe 10 immersed in liquid, advancing the electrical power input to the transducer at first results in a trace on the cathode ray tube of frequency analyzer 56, consisting of a series of high amplitude spikes which indicate first the exciting frequency of the ultrasonic energy being applied to the transducer. This first trace is shown in FIGURE 4a. As the power is progressively increased, spikes or predominant responses at the harmonics of the exciting frequency occur and are displayed on the cathode ray tube of the analyzer. Further increase in power eventually leads to gross cavitation and gives rise to hash or random cavitation noise indications (see FIGURE 4b). These appear between the spikes of the exciting and harmonic frequencies. Depending on the width of a sweep, one or more harmonic spikes can be displayed. If the sweep width of the frequency analyzer is adjusted so that a number of harmonics are displayed, the cavitation noise bands will be seen to appear in more than one interharmonic valley.

It has been found that this embodiment of the present invention is sufficiently sensitive to detect the appearance and disappearance of this spectrum, as the result of the variations in power transmission along the acoustic transmission line according to local variations in the condition of the liquid related to remoteness from or nearness to a boiling condition.

It will be appreciated that probe 10 may have the free end of coupler 12, which is immersed in the liquid, equipped with any one of a variety of probe face geometries, so long as these are consistent with well known acoustical dimensioning requirements. It should be noted that a small probe face will occasion a relatively reduced signal intensity. However, even in the case of an extremely small probe face, about 1/16-inch in diameter, it was found that the characteristic harmonic spikes and random noise were clearly discernible.

In the embodiment shown in the diagram of FIGURE 3, two sensing elements are used instead of one, in order to show an application involving direct readout rather than visual readout.

Thus, the free end probe face of probe 10 is diagrammatically shown immersed in a pressurized water reactor, and two sensing elements 28a and 28b are each located at a node of vibration on coupler 12, the two nodes being one-half wavelength apart.

A first band pass amplifier 54a is tuned (note that the noise in the interharmonic valley is thereby filtered out) to either the exciting frequency or the first harmonic and a second band pass amplifier 54b is tuned to the first or second harmonic, the two amplifiers not being tuned to the same harmonic frequency. The signals derived are then passed into an adding or integrating circuit 60, so that when a cavitation-occasioned signal is delivered to the amplifiers, the two combined will add to yield a total signal usable for feedback-type or closed-loop control (designated 62) of the power source 50a for the transducer 18a for direct read-out (designated 64), for use in automatic control of reactor power (designated S).

While the embodiment of FIGURE 3 has been described in connection with two sensing elements, it will be appreciated that one sensing element whose output feeds into the two band pass amplifiers can be used. However, two sensing elements are preferable in this embodiment for safety reasons.

In FIGURE 4, previously referred to, are graphical displays derived from a system operating at 20 kilocycles per second, having harmonic indications (spikes) at 40 kc. and 60 kc. A system operating at 28 kc., for example, would have a spike at 56 kc. in the harmonic position.

Sample data obtained can be seen in FIGURE 5, which shows relative power required to produce cavitation as related to container pressure and liquid temperature. From the plot of this data, it can be seen that the cavitation threshold varies directly with the pressure for a given temperature. It also appears that the detection sensitivity is not markedly pressure-dependent.

It can be seen from the above description that the remoteness from or nearness to boiling of a liquid is determined without the necessity for direct reading of the temperature and pressure at particular points within the reactor or in connection with a water- or other liquid-utilizing industrial system which is subject to boiling. By comparing the cavitation threshold for the particular probe installation with a curve previously recorded, it may be determined when the liquid is reaching or has reached the temperature and pressure conditions necessary for boiling.

While this invention has been described in connection with 20 kc. and 28 kc. systems, it can be used without any such limitation, being usable at sonic or ultrasonic frequencies.

The present invention has been successfully operated at boiling water temperatures, and it is particularly suitable for extraordinary environments (such as high-pressure, high-temperature, and/or high-radiation environments. It can be installed so as to have all complicated parts at one end of the probe (transducer, windings, generating equipment, and appropriate indicating equipment) located outside of such an environment with only the other end of the probe located in the environment.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for determining incipient boiling of a liquid or the imminence thereof, comprising a vibratory probe for producing controlled vibratory motion within a liquid, noise detection means coupled to said probe for detecting cavitation noise adjacent said probe, and power sensing means for sensing the power transmitted to said vibratory probe, so that comparison may be made between the power transmitted to said probe necessary to cause cavitation to a standard dependent upon the boiling point of the liquid.

2. Apparatus in accordance with claim 1 wherein said vibratory probe is an ultrasonic transducer-coupler system, said system being powered by an alternating current source at a given exciting frequency and at a power level sufficient to effect cavitation in the liquid, said cavitation noise exciting harmonics of the exciting frequency in the system, said noise detection means being adapted to sense the harmonics in said system.

3. Apparatus in accordance with claim 1 wherein said vibratory probe includes a flexible wire-like probe, said wire-like probe being secured to a force-insensitive mount adapted to be connected to the wall of a vessel, said noise detection means being connected to said vibratory probe on the side of said force-insensitive mount opposite from the interior of the vessel.

4. The apparatus in accordance with claim 1 wherein said noise detection means includes sensing elements mounted at nodal points along said transducer.

5. A method of determining incipient boiling of a liquid or the imminence thereof, comprising the steps of providing a sonic conductor of rigid construction, engaging the liquid with the conductor, applying a minimum level of vibratory energy through the conductor to the liquid at a frequency substantially the same as the natural frequency of the conductor, increasing the level of applied vibratory energy until the liquid cavitates, detecting the occurrence of cavitation and measuring the level of the applied vibratory energy required to induce cavitation, the remoteness of the liquid from incipient boiling being related to the amount of vibratory energy required to produce cavitation.

References Cited by the Examiner

UNITED STATES PATENTS

| | | | |
|---|---|---|---|
| 2,514,080 | 7/1950 | Mason | 73—67.3 X |
| 2,614,645 | 10/1952 | Wilhelm | 73—69 X |
| 3,201,970 | 8/1965 | Beaugh et al. | 73—17 |

RICHARD C. QUEISSER, *Primary Examiner.*

JOHN P. BEAUCHAMP, *Examiner.*